(12) United States Patent
Pape et al.

(10) Patent No.: US 10,255,197 B2
(45) Date of Patent: Apr. 9, 2019

(54) ADAPTIVE TABLEWALK TRANSLATION STORAGE BUFFER PREDICTOR

(71) Applicant: Oracle International Corporation, Redwood City, CA (US)

(72) Inventors: John Pape, Cedar Park, TX (US); Manish Shah, Austin, TX (US); Gideon Levinsky, Cedar Park, TX (US); Jared Smolens, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 240 days.

(21) Appl. No.: 15/215,027

(22) Filed: Jul. 20, 2016

(65) Prior Publication Data

US 2018/0024941 A1  Jan. 25, 2018

(51) Int. Cl.
*G06F 12/00* (2006.01)
*G06F 12/1045* (2016.01)
*G06F 12/0811* (2016.01)
*G06F 12/0875* (2016.01)
*G06F 12/1009* (2016.01)
*G06N 7/00* (2006.01)

(52) U.S. Cl.
CPC ...... *G06F 12/1063* (2013.01); *G06F 12/0811* (2013.01); *G06F 12/0875* (2013.01); *G06F 12/1009* (2013.01); *G06N 7/005* (2013.01); *G06F 2212/452* (2013.01); *G06F 2212/60* (2013.01); *G06F 2212/62* (2013.01); *G06F 2212/682* (2013.01)

(58) Field of Classification Search
CPC ............ G06F 12/1063; G06F 12/0811; G06F 12/0875; G06F 12/1009; G06F 2212/452; G06F 2212/60; G06F 2212/62; G06F 2212/682; G06N 7/005
See application file for complete search history.

(56) References Cited

U.S. PATENT DOCUMENTS

| 5,680,565 | A | * | 10/1997 | Glew | G06F 9/3834 |
| | | | | | 711/205 |
| 2007/0061547 | A1 | * | 3/2007 | Jordan | G06F 12/1027 |
| | | | | | 711/207 |
| 2009/0094435 | A1 | * | 4/2009 | Lu | G06F 12/0862 |
| | | | | | 711/216 |
| 2012/0331265 | A1 | | 12/2012 | Rozario | |
| 2013/0103923 | A1 | * | 4/2013 | Pan | G06F 12/1027 |
| | | | | | 711/207 |

(Continued)

*Primary Examiner* — Francisco A Grullon
(74) *Attorney, Agent, or Firm* — Meyertons, Hood, Kivlin, Kowert & Goetzel, P.C.

(57) ABSTRACT

A system for generating predictions for a hardware table walk to find a map of a given virtual address to a corresponding physical address is disclosed. The system includes a plurality of memories, which each includes respective plurality of entries, each of which includes a prediction of a particular one of a plurality of buffers which includes a portion of a virtual to physical address translation map. A first circuit may generate a plurality of hash values to retrieve a plurality of predictions from the plurality of memories, where each has value depends on a respective address and information associated with a respective thread. A second circuit may select a particular prediction of the retrieved predictions to use based on a history of previous predictions.

14 Claims, 8 Drawing Sheets

(56) References Cited

U.S. PATENT DOCUMENTS

2013/0326143 A1    12/2013  Chen
2013/0326198 A1*   12/2013  Meier ................... G06F 9/3834
                                                         712/216
2015/0370732 A1*   12/2015  Tanimoto ................ G06F 13/14
                                                         711/148

* cited by examiner

| Primary TSB value 501a | Secondary TSB value 501b | Prediction strength value 502 | Prediction confidence value 503 |

ADAPTIVE TABLEWALK TRANSLATION STORAGE BUFFER PREDICTOR

BACKGROUND

Technical Field

This invention relates to computing systems, and more particularly, to techniques for mapping virtual and real memory addresses to physical memory addresses.

Description of the Related Art

Computing systems may include multiple processors or nodes, each of which may include multiple processor cores. Such systems may also include various Input/Output (I/O) devices, which each processor may send data to or receive data from. For example, I/O devices may include Ethernet network interface cards (NICs) that allow the processors to communicate with other computer systems, and external peripherals such as printers, for example. Various forms of storage devices, such as, e.g., mechanical and solid-state disk drives, and the like, may also be included with a computing system.

During execution of user application or other software instructions, processors or processor cores may access data or additional software instructions in memory. Accesses to memory to retrieve desired data or software instructions may be made using a virtual address space which an operating system makes available to a particular process being executed on a processor or processor core.

When memory is be accessed, the desired virtual address must be translated to a corresponding physical address in the memory. In some computing systems, a table, mapping virtual addresses to physical addresses may be maintained. During a memory access, the table may be checked to determine a physical address corresponding to a desired virtual address.

SUMMARY OF THE EMBODIMENTS

Various embodiments of an apparatus and method for accessing a virtualized device in a computing system are disclosed. Broadly speaking, a method and apparatus are contemplated in which each memory of a plurality of memories includes a plurality of entries, each of which includes a respective prediction of a plurality of predictions. Each prediction of the first plurality of predictions includes information identifying a given one of a plurality of buffers. A first circuit may be configured to receive a plurality of addresses and generate a plurality of hash values, where each hash value is dependent upon a respective one of the plurality of addresses and identification information associated with a respective process of a plurality of processes. The first circuit may be further configured to retrieve a respective prediction of a plurality of retrieved predictions from each one of the plurality of memories dependent upon a respective one of the plurality of hash values. A second circuit may be configured to select a given prediction of the plurality of retrieved predictions dependent upon a history of previous predictions.

In a non-limiting embodiment the first circuit may be further configured to generate a second hash value of the plurality of hash values dependent upon a first hash value of the plurality of hash values.

In one implementation, the second circuit may include a plurality of counters. The second circuit may be further configured to select the given prediction dependent upon a respective value of each counter of the plurality of counters.

BRIEF DESCRIPTION OF THE DRAWINGS

FIG. 5 is a block diagram of an embodiment of a predictor memory entry.

Figure 1:
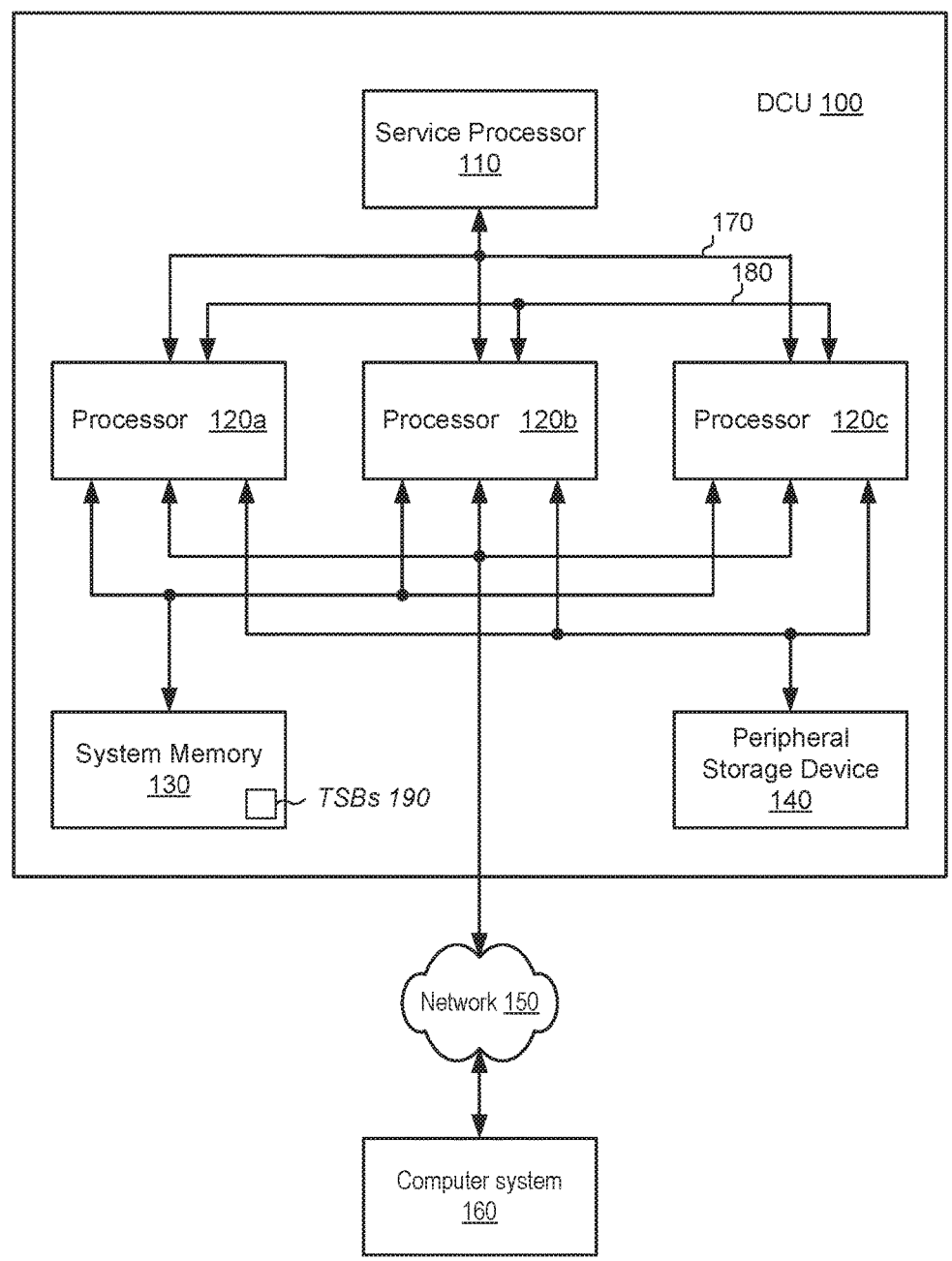
FIG. 1 is a block diagram of an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Some computing systems employ a single operating system that allocates ranges of virtual (also referred to as "logical") addresses for processes being executed by the computing system. By specifying different ranges of virtual addresses for the different processes, memory accesses by individual processes may be isolated. During a memory access, the operating system may translate a particular virtual address to a physical address, which corresponds to particular location in memory.

In some computing systems, multiple operating systems may be employed. To accommodate multiple operating systems, another layer of software (also referred to as a "hypervisor layer") may be used to manage communication between the different operating systems and the hardware of the computing system. In such cases, during a memory access, an operating system associated with a given process may translate a particular virtual address to a real address, which is passed on the layer of software for further translation. The layer of software may translate the real address to a physical address in memory.

In some cases, two processes executing under a common operating system may use the same range of virtual addresses. When this occurs, the operating system assigns each process a unique identifier (also referred to herein as a "context identifier") which is employed during the translation process, allowing the same range of virtual addresses to map into two different ranges of real addresses, one range for each process.

A similar situation may occur during the translation of real addresses into physical addresses. When two processes share a range of real addresses, the hypervisor layer may assign an identifier (also referred to herein as a "partition identifier") to each process. The partition identifiers are then used during the translation process into physical addresses, allowing each the shared range of real addresses to map to different physical addresses.

During the address translation, maps of one address type to another may be employed. In the description that follows, the maps may be used in the translation of virtual to physical addresses. It is noted, however, that the other maps may be used in the translation of virtual addresses to real address, and real addresses to physical addresses. A map of virtual addresses and the corresponding physical addresses (commonly referred to as a "page table") may be stored in memory. In some cases, frequently used map entries may be stored (or "cached") in a memory included in the processor or processor core referred to as a translation lookaside buffer (TLB). A TLB typically has low latency, but does not store a complete version of the map. When a translation for a desired virtual address cannot be found in a TLB, the rest of the page table will be searched for the translation.

In some computing systems, different TLBs may be used in conjunction with different cache memories in the computing system. For example, access to an instruction cache in the computing system may use an instruction TLB (or "ITLB") that includes map entries that have been frequently used while accessing the instruction cache. Similarly, a data TLB (or "DTLB") may include map entries that have been frequently used while accessing a data cache in the computing system.

The complete page table may be divided into different portions, each of which may be stored in a corresponding buffer (also referred to herein as a "translation storage buffer" or "TSB"). During a search of the page table, each of the multiple buffers may be searched. In some systems, the multiple buffers may be searched in parallel, resulting in an increase in power consumption and an increase in consumed memory bandwidth.

Other systems may search the buffers sequentially and predict an initial buffer to search first. Incorrect predictions may results in increases in latency because the original memory request remains waiting until the desired translation is found. Such incorrect predictions may also result in additional power consumption because searches to subsequent buffers result in additional memory requests.

In some systems, changes in workload may affect prediction accuracy. Moreover, in multi-threaded processors and processor cores, the workload associated with each thread may be different, which may affect prediction accuracy from thread to thread. The embodiments illustrated in the drawings and described below may provide techniques for predicting a buffer to search for a particular translation while adjusting for differences in workloads in various processing threads.

A block diagram illustrating one embodiment of a computing system 100 is shown in FIG. 1. In the illustrated embodiment, computing system 100 includes a service processor 110, coupled to a plurality of processors 120a-c through bus 170. It is noted that in some embodiments, service processor 110 may additionally be coupled to system memory 130 through bus 170. Processors 120a-c are, in turn, coupled to system memory 130, and peripheral storage device 140. Processors 120a-c are further coupled to each other through bus 180 (also referred to herein as "coherent interconnect 180"). Computing system 100 is coupled to a network 150, which is, in turn coupled to a computer system 160. In various embodiments, computing system 100 may be configured as a rack-mountable server system, a standalone system, or in any suitable form factor. In some embodiments, computing system 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed.

In one embodiment, system memory 130 includes translation storage buffers (TSBs) 190. As described below in more detail, TSBs 190 may include a translation map between virtual addresses used by processors 120a-c and the physical addresses of system memory 130. Although a single TSB is depicted in the embodiment illustrated in FIG. 1, in other embodiments, any suitable number of TSBs may be employed.

Peripheral storage device 140 may, in some embodiments, include storage media such as hard drives, solid-state disk drives, optical disks, non-volatile random-access memory devices, and the like. In other embodiments, peripheral storage device 140 may include more complex storage devices such as disk arrays or storage area networks (SANs), which may be coupled to processors 120a-c via a standard Small Computer System Interface (SCSI), a Fiber Channel interface, a Firewire® (IEEE 1394) interface, or any other suitable interface. Additionally, it is contemplated that in other embodiments, any other suitable peripheral devices may be coupled to processors 120a-c, such as multi-media devices, graphics/display devices, input/output devices, etc.

In one embodiment, service processor 110 may include a field programmable gate array (FPGA) or an application specific integrated circuit (ASIC) configured to coordinate initialization and boot of processors 120a-c, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120a-c, such as testing cache memories in processors 120a-c, or providing test code to processors 120a-c such that each of processors 120a-c may test their respective cache memories, for example.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120*a-c* may be configured to concurrently perform independent tasks that require little or no coordination among processors 120*a-c*.

The embodiment of the computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core.

Figure 2:
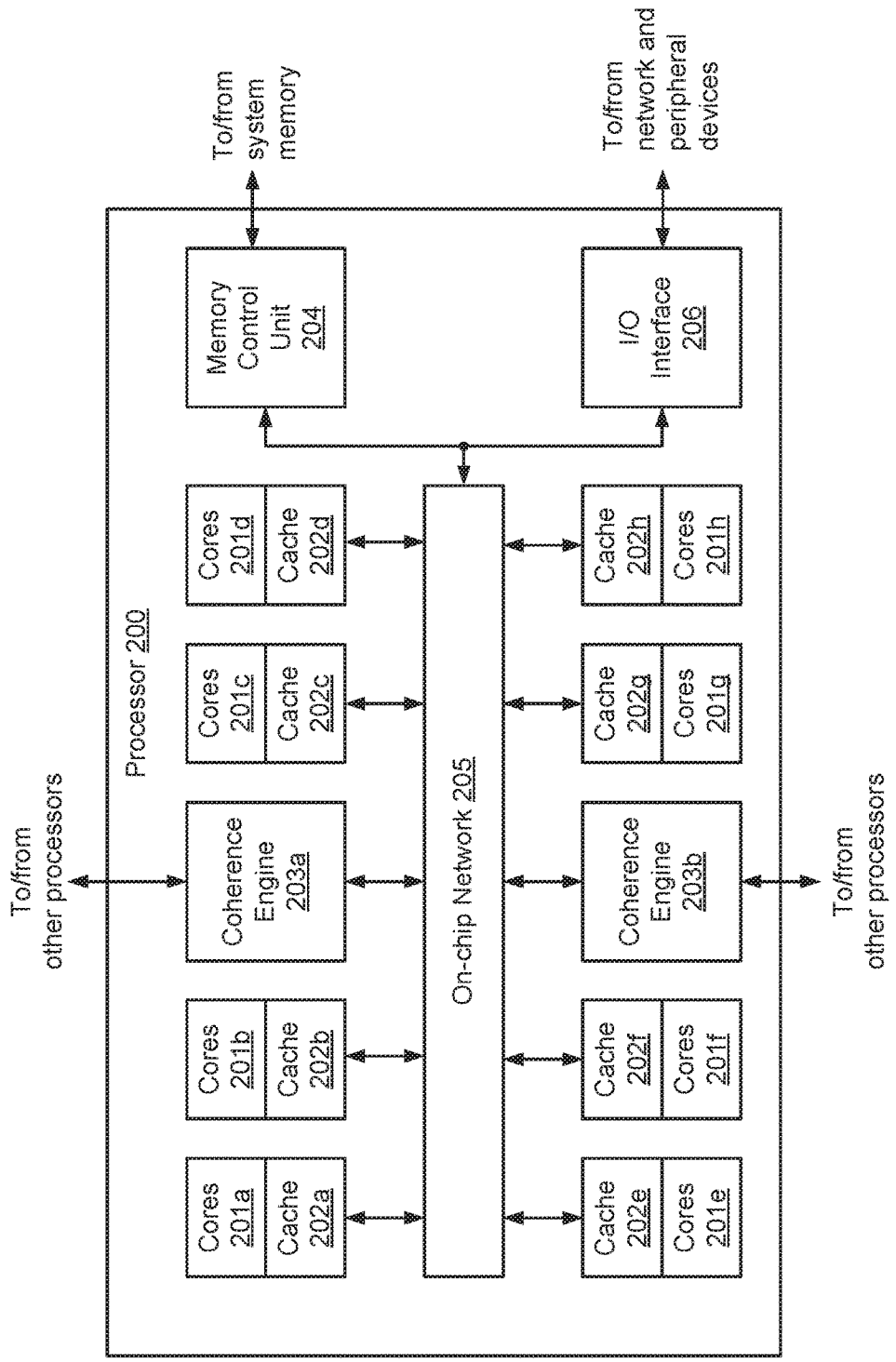
FIG. 2 is a block diagram of an embodiment of a processor.

A block diagram illustrating one embodiment of a processor 200 is shown in FIG. 2. In some embodiments, processor 200 may correspond to processors 120*a-c* of computing system 100 in FIG. 1. In the illustrated embodiment, processor 200 includes a plurality of processor core groups 201*a-h*, each including one or more processor cores. It is noted that although 8 core groups are shown, in various embodiments, any suitable number of processor cores groups may be employed. Each of core groups 201*a-h* is coupled to a respective one of cache memory partitions 202*a-h*. Collectively, cache memory partitions 202*a-h* form a cache memory for the core groups 201*a-h*. Each of cache memory partitions 202*a-h* is coupled to on-chip network 205, which is, in turn coupled to memory control unit 204. In various embodiments, memory control unit 204 is coupled to one or more banks of system memory, also referred to herein as main memory (not shown). Processor 200 further includes coherence engines 203*a-b*, which are also coupled to on-chip network 205 as well as to other processors. In some embodiments, the elements included in processor 200 may be fabricated as part of a single integrated circuit (IC), for example on a single semiconductor die.

Each of core groups 201*a-h* may include one or more processor cores, and be configured to execute instructions and to process data according to a particular instruction set architecture (ISA). In one embodiment, core groups 201*a-h* may be configured to implement the SPARC® V9 ISA, although in other embodiments it is contemplated that any desired ISA may be employed, such as x86, PowerPC® or MIPS®, for example. In the illustrated embodiment, each of core groups 201*a-h* may be configured to operate independently of the others, such that all core groups 201*a-h* may execute in parallel. As described below in more detail, each of core groups 201*a-h* may include a predictor circuit configured to select a particular TSB (not shown) for searching during a Hardware Table Walk (HWTW) in response to translating a virtual address to a physical address.

Cache memory partitions 202*a-h* may, in various embodiments, collectively form a level 3 (L3) cache memory for processor 200. The multiple cache memory partitions need to maintain coherency with respect to each other. Cache memory partitions 202*a-h* may, in various embodiments, implement one of numerous coherency protocols, such as, e.g., MOESI, MESI, or any suitable cache coherency protocol.

Memory control unit 204 may be configured to manage the transfer of data between cache memory partitions 202*a-h* and system memory, for example in response to fill requests and data evictions. In some embodiments, multiple instances of memory control unit 204 may be implemented, with each instance configured to control a respective bank of system memory. Memory control unit 204 may be configured to interface to any suitable type of system memory, such as described above in reference to FIG. 1 In some embodiments, memory control unit 204 may be configured to support interfacing to multiple different types of system memory.

I/O interface 206 may be configured to coordinate data transfer between processor 200 and one or more peripheral devices and/or other computer systems. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio or video processing subsystems), or any other suitable type of peripheral device. In one embodiment, I/O interface 206 may implement one or more instances of an interface such as Peripheral Component Interface Express (PCI Express™), Universal Serial Bus (USB) protocol, or IEEE 1394 (Firewire®) protocol. For data transfers to/from other computing systems, I/O interface 206 may be configured to transfer data according to an Ethernet (IEEE 802.3) networking standard such as Gigabit Ethernet or 10-Gigabit Ethernet.

It is noted that the embodiment illustrated in FIG. 2 is merely an example. In other embodiments, different functional units, different numbers of cores, caches and functional units, and different configurations of cores, caches, and functional units are possible and contemplated.

Figure 3:
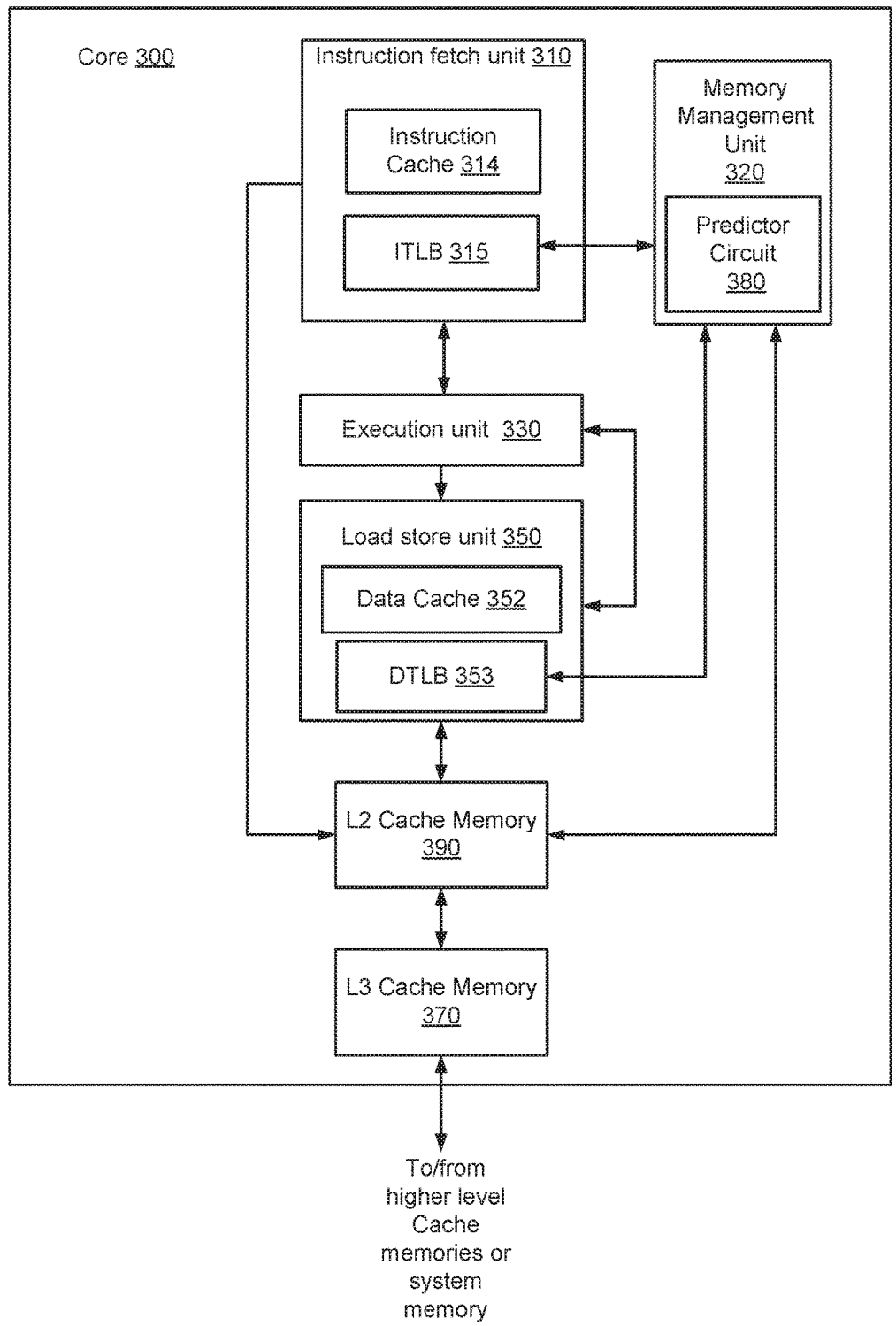
FIG. 3 is a block diagram of an embodiment processor core.

A possible embodiment of a core included in core groups 201*a-h* is illustrated in FIG. 3. In the illustrated embodiment, core 300 includes an instruction fetch unit (IFU) 310 coupled to a memory management unit (MMU) 320, predictor circuit 380, an L2 cache memory 390, an L3 cache memory 370, and one or more of execution units 330. Execution unit(s) 330 is coupled to load store unit (LSU) 350, which is also coupled to send data back to each of execution unit(s) 330. Additionally, LSU 350 is coupled to L2 cache memory 390, which may in turn be coupled to L3 cache memory 370. In some embodiments, L3 cache memory 370 may be coupled to higher-level cache memories or system memory via an on-chip network such as, on-chip network 205 as illustrated in FIG. 2, for example.

Instruction fetch unit 310 may be configured to provide instructions to the rest of core 300 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314. In one embodiment, IFU 310 may include logic to maintain fetch addresses (e.g., derived from program counters) corresponding to each thread being executed by core 300, and to coordinate the retrieval of instructions from instruction cache 314 according to those fetch addresses.

If core 300 is configured to execute only a single processing thread, and branch prediction is disabled, fetches for the thread may be stalled when a branch is reached until the branch is resolved. Once the branch is evaluated, fetches may resume. In cases where core 300 is capable of executing more than one thread and branch prediction is disabled, a thread that encounters a branch may yield or reallocate its fetch slots to another execution thread until the branch is resolved. In such cases, an improvement in processing efficiency may be realized. In both single and multi-threaded modes of operation, circuitry related to branch prediction may still operate even through the branch prediction mode is disabled, thereby allowing the continued gathering of data regarding numbers of branches and the number of mispredictions over a predetermined period.

In one embodiment, IFU 310 may be configured to maintain a pool of fetched, ready-for-issue instructions drawn from among each of the threads being executed by core 300. For example, IFU 310 may implement a respective instruction buffer corresponding to each thread in which several recently-fetched instructions from the corresponding thread may be stored. In some embodiments, IFU 310 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 310 may be configured to further prepare instructions for execution, for example by decoding instructions, detecting scheduling hazards, arbitrating for access to contended resources, or the like. Moreover, in some embodiments, instructions from a given thread may be speculatively issued from IFU 310 for execution. For example, a given instruction from a certain thread may fall in the shadow of a conditional branch instruction from that same thread that was predicted to be taken or not-taken, or a load instruction from that same thread that was predicted to hit in a data cache, but for which the actual outcome has not yet been determined. In such embodiments, after receiving notice of a misspeculation such as a branch misprediction or a load miss, IFU 310 may be configured to cancel misspeculated instructions from a given thread as well as issued instructions from the given thread that are dependent on or subsequent to the misspeculated instruction, and to redirect instruction fetch appropriately. Additionally, in some embodiments IFU 310 may include a portion of a map of virtual instruction addresses to physical addresses. The portion of the map may be stored in ITLB 315 and may include map entries that were frequently used during instruction fetching.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 300 may include more than one execution unit 330, and each of the execution units may or may not be configured to provide the same functionality. Finally, in the illustrated embodiment instructions destined for LSU 350 pass through execution unit 330. In alternative embodiments, however, it is contemplated that such instructions may be issued directly from IFU 310 to their respective units without passing through execution unit 330.

Load store unit 350 may be configured to process data memory references, such as integer and floating-point load and store instructions. In some embodiments, LSU 350 may also be configured to assist in the processing of instruction cache 314 misses originating from IFU 310. LSU 350 may include a data cache 352 as well as logic configured to detect cache misses and to responsively request data from L2 cache memory 390. In one embodiment, data cache 352 may be configured as a write-through cache in which all stores are written to L2 cache memory 390 regardless of whether they hit in data cache 352. Alternatively, in some embodiments, stores that miss in data cache 352 may cause an entry corresponding to the store that missed to be allocated within data cache 352. In other embodiments, data cache 352 may be implemented as a write-back cache.

In one embodiment, LSU 350 may include a miss queue configured to store records of pending memory accesses that have missed in data cache 352 such that additional memory accesses targeting memory addresses for which a miss is pending may not generate additional L2 cache request traffic. In the illustrated embodiment, address generation for a load/store instruction may be performed by execution unit 330. Depending on the addressing mode specified by the instruction, execution unit 330 may perform arithmetic (such as adding an index value to a base value, for example) to yield the desired address. Additionally, in some embodiments LSU 350 may include logic configured to translate virtual data addresses generated by execution unit 330 to physical addresses, such as a data translation lookaside buffer (DTLB) 353.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques.

L2 cache memory 390 may be implemented as a writeback cache in which written (dirty) data may not be written to the L3 cache memory 370 or system memory until a corresponding cache line is evicted. L2 cache memory 390 may variously be implemented as single-ported or multiported (i.e., capable of processing multiple concurrent read and/or write accesses). In either case, L2 cache memory 390 may implement arbitration logic to prioritize cache access among various cache read and write requestors.

As previously described, instruction and data memory accesses may involve translating virtual addresses to physical addresses. A frequently-used portion of the map between virtual and physical addresses may be stored in ITLB 315 and DTLB 353. The portion of the map may include frequently used virtual addresses thereby allowing for rapid translation of virtual addresses during accesses to instruction cache 314 and data cache 352. The remaining portion of the map between virtual and physical addresses may be stored in one or more TSBs located in system memory or any other suitable storage device or location.

In the event no translation for a given virtual address is found in the appropriate one of ITLB 315 and DTLB 353, the one or more TSBs may be searched by MMU 320 to provide a translation (commonly referred to as a "hardware table walk" or "HWTW" as stated above) for the given virtual address. Predictor circuit 380 may be configured to determine which of the one or more TSBs to search first. By attempting to predict the most likely location of the desired portion of the translation map, reduction in latency of the original memory request that caused the translation request may be achieved. Such prediction methods, may alternatively or additionally, reduce a number of memory accesses, thereby saving bandwidth to the memory and power consumption.

As described below, in more detail, predictor circuit 380 may select a TSB to search based on a current workload of core 300. For example, in the case of workloads with large active address spaces, the higher order bits of a virtual address may demonstrate a strong correlation with which TSB is most likely to include the desired information. In cases of workloads with a limited range of virtual addresses, the lower order bits of the virtual address may show a correlation with the TSB most likely to include the desired information. In one embodiment, predictor circuit 380 may employ multiple predictor tables and multiple hashes of virtual address bits to select the TSB with the highest probability of including the desired information. It is noted that while a single predictor circuit is depicted in the embodiment of FIG. 3, in other embodiments, multiple predictor circuits may be employed to allow for multiple address lookups to be performed in parallel.

It is noted that the embodiment illustrated in FIG. 3 is merely an example. In other embodiments, different functional block or configurations of functional blocks are possible and contemplated.

Figure 4:
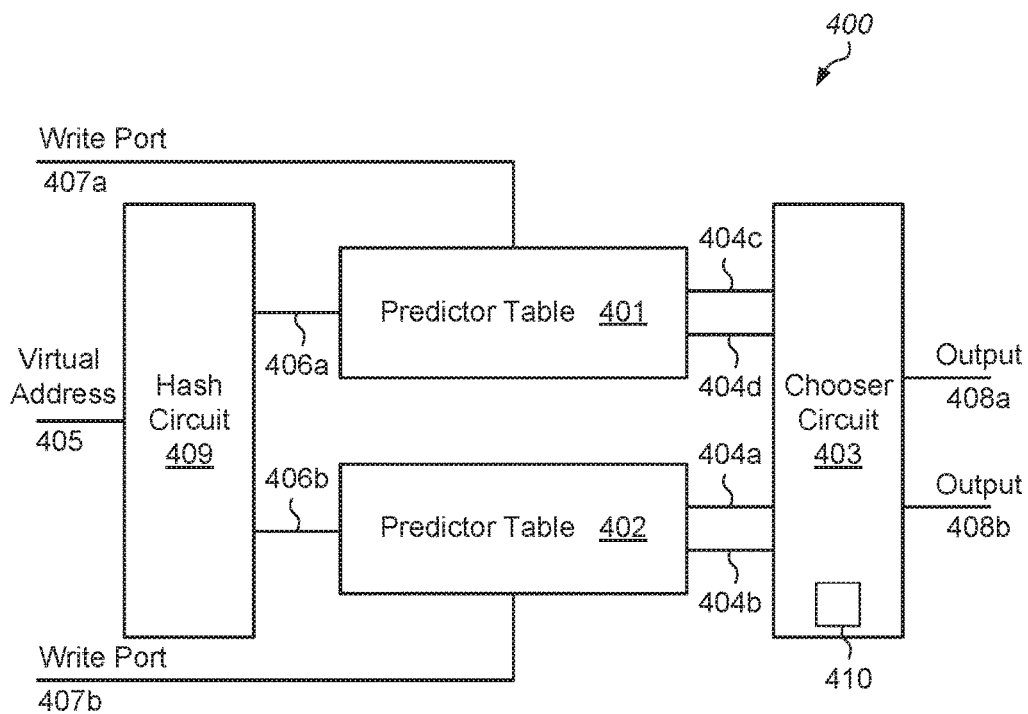
FIG. 4 is a block diagram of an embodiment of a predictor circuit.

Turning to FIG. 4, an embodiment of a predictor circuit is illustrated. In various embodiments, predictor circuit 400 may correspond to predictor 380 as illustrated in FIG. 3. In the illustrated embodiment, predictor circuit 400 includes predictor table 401, predictor table 402, hash circuit 409, and chooser circuit 403. Output read ports of predictor table 401 are coupled to chooser circuit 403, and output read ports of predictor table 402 are also coupled to chooser circuit 403.

Each of predictor tables 401 and 402 include multiple entries, and may be implemented using a memory, register file, or any other suitable storage circuit. As described below, in more detail, each entry in predictor tables 401 and 402 may include information identifying a particular TSB, as well as a counter value indicative of a strength of a prediction (commonly referred to as a "saturating counter"). During operation, predictor tables 401 and 402 may output two predictions 404*c*-*d*, and 404*a*-*b*, respectively. The two predictions may include a primary prediction and a secondary prediction. For example, 404*c* may correspond to a primary prediction, and 404*d* may correspond to a secondary prediction. As described below in more detail, chooser circuit 403 will select between the output of either predictor table 401 and predictor table 402 dependent upon the current workload. During a HWTW, the TSB corresponding to the primary prediction of the selected predictor table will be searched for the desired map entry. If the desired map entry is not found, then the TSB corresponding to the secondary prediction of the selected predictor table will be searched for the desired map entry.

As described above, different processes may employ the same range of virtual or real addresses. When this occurs, identification information assigned to the process by the operating system and/or the hypervisor layer may be used in determining how the addresses will be mapped. For example, a portion of a virtual address may be combined with either a context identifier or a partition identifier to form an index for accessing predictor tables. In one embodiment, hash circuit 409 may be configured to generate hashes 406*a* and 406*b* using portions of virtual address 405 and either the context or partition identifier, or suitable combination thereof. Hash circuit 409 may generate hash 406*a* by combining bits 28-58 of virtual address 405 with the particular processing thread information. Moreover, hash circuit 409 may be configured to perform an exclusive-OR operation between hash 406*a* and bits 22-27 of virtual address 405 to form hash 406*b*. Hash circuit 409 may store hashes 406*a* and 406*b* so that the values may be used in updating the entries in predictor tables 401 and 402 in response to determining the accuracy of a particular prediction.

It is noted that although a single hash circuit is depicted in the embodiment illustrated in FIG. 4, in other embodiments, multiple hash circuits may be employed. For example, in some embodiments, two hash circuits may be employed, one used for instruction fetches, the other used for data fetches.

Chooser circuit 403 may be configured to select between the output of predictor tables 401 and 402 to generate outputs 408*a* and 408*b* based on a history of previous predictions received from predictor tables 401 and 402, and their respective accuracies. The history of previous predictions may include information indicative of how accurate previous predictions from each of the predictor tables have been for a particular workload. As described below in more detail, such history information may be stored and updated using counters, although, in other embodiments, any suitable storage circuit may be employed.

It is noted that although two predictor tables are depicted in the embodiment illustrated in FIG. 4, in other embodiments, any suitable number of predictor tables may be employed. For example, in some embodiments, separate predictor tables may be used for each execution thread. In one embodiment, chooser circuit 403 includes counter 410. The value of counter 410 may be used to select between the outputs of predictor tables 401 and 402. For example, when the value of counter 410 is positive, the output of predictor memory 401 may be selected, and when the value of counter 410 is negative, the output of predictor memory 402 may be selected. Although a single counter is illustrated, in other embodiments, multiple counters may be employed, each corresponding to a particular execution thread, thereby allowing for TSB predictions that are thread dependent.

During operation, hash circuit 409 may receive virtual address 405, and generate hashes 406*a* and 406*b*. Although a single virtual address is depicted in one embodiment, in other embodiments, any suitable number of addresses may be employed. Each of predictor tables 401 and 402 may be accessed using hashes 406*a* and 406*b*, respectively. In embodiments employing more than two predictor tables, hash circuit 409 may generate a respective hash for each predictor memory. Predictions 404*a*-*d* corresponding to hashes 406*a* and 406*b* may then be retrieved from predictor tables 401 and 402, and sent to chooser circuit 403. Dependent upon a value of counter 410, one of the predictions from predictor tables 401 and 402 is output via output 408*a* and 408*b*. In some embodiments, predictions 404*a* and 404*c* may correspond to predictions of primary TSBs and predictions 404*b* and 404*d* may correspond to predictions of secondary TSBs. In the illustrated embodiment, output 408*a* may specify the primary TSB to search for the desired address, selected between 404*a* and 404*c*, and 408*b* may specify the chosen secondary TSB to be selected in the event the desired address is not found in the primary TSB, selected between 404*b* and 404*d*. It is noted that in cases where multiple predictor circuits are employed, predictor tables 401 and 402 may be shared between the various predictor circuits.

Once the prediction of the TSB to search has been verified as being correct (a "hit" using either the primary or secondary prediction) or incorrect (a "miss" with both the primary and secondary prediction), chooser circuit 403 may update counter 410. For example, counter 410 may be updated as depicted in Table 1. As described below in more detail, the counter values included in the selected entries from predictor tables 401 and 402 may also be updated dependent upon the if the predictor was correct or not.

TABLE 1

Chooser Counter Update

| Prediction from Table 1 correct | Prediction from Table 2 correct | Chooser Action |
|---|---|---|
| No | No | None |
| No | Yes | Increment counter (towards table 2) |
| Yes | No | Decrement counter (towards table 1) |
| Yes | Yes | None |

It is noted that the embodiment depicted in FIG. 4 is merely an example. In other embodiments, different numbers of predictor tables and different arrangements of predictor tables are possible and contemplated.

As described above, each of predictor tables 401 and 402 include multiple entries. An embodiment of such an entry is illustrated in FIG. 5. In the illustrated embodiment, entry 500 includes primary TSB value 501a, secondary TSB value 501b, prediction strength value 502, and prediction confidence value 503.

Primary TSB value 501a and secondary TSB value 501b may each include a 2-bit value, which identifies a particular TSB. For example, a value of "00" stored in primary TSB value 501a may correspond to a first TSB, while a value of "01" stored in primary TSB value 501a may correspond to a second TSB. It is noted that in one embodiment, two data bits are used in each of primary TSB value 501a and secondary TSB value 501b, thereby allowing identification of four different TSBs. In other embodiments, additional data bits may be employed allowing for the identification of larger numbers of TSBs.

Prediction strength value 502 includes a value indicating the strength of a prediction associated with the TSBs identified in primary TSB value 501a and secondary TSB value 501b. In the illustrated embodiment, prediction strength value 502 includes two data bits, although, in other embodiments, any other suitable number of data bits may be employed. In various embodiments, strength value 502 may be treated as a saturation counter.

During operation, primary TSB value 501a, secondary TSB value 501b, and strength value 502 may be updated based on the accuracy of the prediction. For example, if the TSB predicted by primary TSB value 501a is correct, then strength value 502 may be increased, unless the value is already at a maximum value. Other possible updates are illustrated in Table 2. If the prediction was correct, then the strength of the prediction is incremented unless it is already at is maximum value (i.e., the prediction strength value 502 is saturated). If there was a misprediction, and the prediction strength is zero, then primary TSB value 501a is updated to the value of the TSB where the desired virtual address was located, and the strength values remains at zero. Alternatively, if there was a misprediction and the strength value was greater than zero, then the strength value is decremented.

TABLE 2

Predictor Entry Table Update

| Current Strength | TSB Misprediction | Next Strength value | Next TSB value |
|---|---|---|---|
| !11 (not strongest) | No | +01 (stronger) | No change |
| 00 (weakest) | Yes | 00 (weakest) | Hit TSB |

TABLE 2-continued

Predictor Entry Table Update

| Current Strength | TSB Misprediction | Next Strength value | Next TSB value |
|---|---|---|---|
| 11 (strongest) | No | 11 (strongest) | No change |
| !00 (weakest) | Yes | −01 (weaker) | No change |

As described below in regard to FIG. 8, a confidence of a prediction may be tracked on a per prediction basis. Prediction confidence value 503 may include multiple data bits and represent a confidence in the prediction. In the illustrated embodiment, prediction confidence value 503 may be decremented in response to the detection of a misprediction, and incremented in response to a correct prediction. By tracking the confidence of each prediction, only those predictions, which are determined to be less reliable, will trigger multiple search requests in parallel. If a prediction is determined to be unreliable, then multiple search requests may be triggered. Such requests may consume more memory bandwidth, but decrease the latency of finding a correct TSB. If the prediction is determined to be reliable, then requests may be sent sequentially, starting with the predicted TSB.

It is noted that the entry described in regard to the embodiment depicted in FIG. 5 is merely an example. In other embodiments, different update mechanism may be employed.

Figure 6:
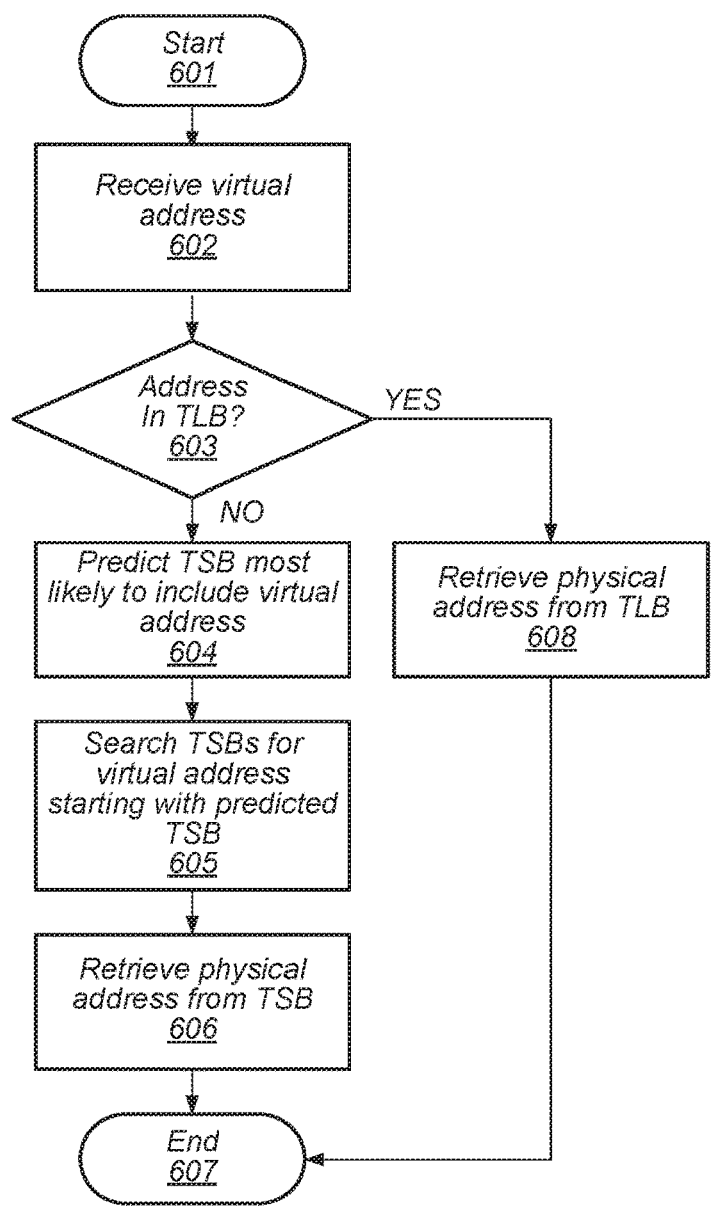
FIG. 6 illustrates a flow diagram depicting an embodiment of method for translating a virtual address to a physical address.

An embodiment of a method for translating a virtual address to a physical address is illustrated in flow diagram depicted in FIG. 6. Referring collectively to the embodiment of FIG. 3, and the flow diagram of FIG. 6, the method begins in block 601. A virtual address may then be received (block 602). The virtual address may a virtual address corresponding to an instruction being fetched by IFU 310, or may be a virtual address corresponding to data being accessed by LSU 350.

The method then depends on if the virtual address is stored in either ITLB 315 or DTLB 353 (block 603). In the case where the virtual address corresponds to an instruction, ITLB 315 is checked for the virtual address, while, in the case where the virtual address corresponds to data being accessed by LSU 350, the LSU 350 will check DTLB 353 for the virtual address. If the desired virtual address is located in either ITLB 315 for an instruction fetch, or DTLB 353 for a data access, then the physical address is retrieved from the appropriate translation lookaside buffer (block 608). Once the physical address has been retrieved, then the either of instruction cache 314 or data cache 352 may be accessed. The method may then conclude in block 606.

Alternatively, if the desired virtual address is not found in one of ITLB 315 or DTLB 353, then predictor circuit 380 may predict which one of multiple TSBs that is most likely to include the desired virtual address (block 604). The prediction may include the generation of two different hashes using respective portions of the virtual address, as well as a history of previous predictions.

Once the prediction is made, the TSBs are searched for the desired virtual address, starting with the predicted TSB (block 605). As described below in more detail, if the predicted TSB does not include the desired virtual address, the remaining TSBs may then be searched. In some embodiments, the remaining TSBs may be searched in a predetermined order. In some cases, secondary prediction may be retrieved from a predictor table, and in response to a determination that the TSB corresponding to the primary prediction does not include the desired virtual address, the TSB corresponding to the secondary prediction may be searched.

When the desired virtual address is found, the corresponding physical address is then retrieved from the TSB in which the desired virtual address was found (block 606). The memory access, either the data access or instruction fetch, may then continue using the retrieved physical address. In some cases, an infrequently used map entry in either the ITLB or DTLB, depending on the type of access, may be replaced with a new map entry corresponding to the desired virtual address, thereby allowing a faster address translation should the desired virtual address be needed again. The method may then conclude in block 607.

It is noted the flow diagram illustrated in FIG. 6 is merely an example. In other embodiments, different operations and different orders of operations may be employed.

Figure 7:
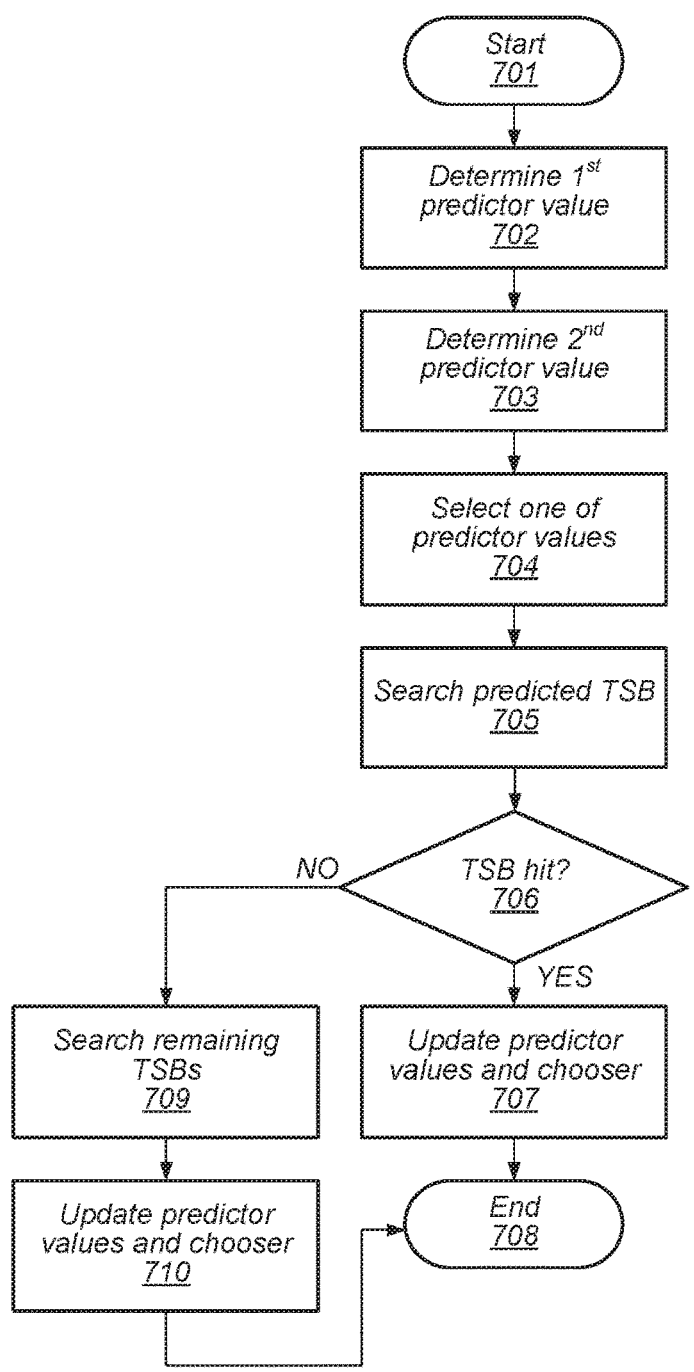
FIG. 7 illustrates a flow diagram depicting an embodiment of a method for selecting one or multiple Translation Storage Buffers.

Turning to FIG. 7, a flow diagram depicting an embodiment of a method for predicting which TSB of multiple TSBs has a desired virtual address is illustrated. Referring collectively to the embodiment in FIG. 4, and flow diagram of FIG. 7, the method begins in block 701.

A first predictor value may then be determined (block 702). The first predictor value may be read from an entry in predictor memory 401 based on hash 406a generated by hash circuit 409. Hash 406b may also be generated by hash circuit 409, and used to access predictor memory 402 to determine a second predictor value (block 703).

Chooser circuit 403 may then select one of the first predictor value and the second predictor value (block 704). As described above, in regard to FIG. 4, the selection may be based on a value of counter 410 included in chooser circuit 403. Once a predictor value has been selected, the TSB predicted by the selected predictor value may be searched for the desired virtual address (block 705). The method may then depend upon if the desired virtual address is found in the predicted TSB (block 706).

If the desired virtual address was found in the predicted TSB, then the value of counter 410 and values in the selected predictor entry may be updated as described above to reflect the correct prediction (block 707). Once the values are updated, the method may conclude in block 708.

The remaining TSBs may then be searched for the desired virtual address (block 709). If, however, the desired virtual address was not found in the predicted TSB, then the value of counter 410 and values in the selected predictor entry may be updated to reflect the incorrect prediction (block 710). Upon finding the desired virtual address, the method may conclude in block 708.

The remaining TSBs may be searched in a predetermined order. Alternatively, a second prediction maybe made to determine a most likely TSB of the remaining TSBs that includes the desired virtual address. In cases using the second prediction, additional data bits may be added the entries in predictor tables 401 and 402. For example, TSB value 501 may include extra data, which encode a second TSB value. If the TSB specified in the initial prediction does not include the desired virtual address, then a TSB specified by the extra data bits may be searched.

Based on results of the search of the TSBs predicted by the primary and secondary predictions, the prediction bits, e.g., TSB value 501, may be updated to further improve prediction accuracy. As described above, the primary prediction will be updated based on the results of the search, and the secondary prediction may then be updated based on how the primary prediction was updated. For example, if the primary predictor state causes the primary predictor bits to point to a new TSB number, then the previous primary TSB number is written to the secondary bits. Alternatively, if the primary predictor state update only changes the strength, e.g., prediction strength 502, but does not change the TSB number the primary bits point to, then there is no change to the secondary state. An example update method is illustrated in Table 3.

For example, in the first row of Table 3, the primary TSB prediction is a hit. When the predictor state is updated, the strength is increased from weak to strong and the primary and secondary TSB predictions remain the same. In the second row of the table, the situation is illustrated where the primary prediction is a miss, but the secondary prediction is correct. When the predictor state is updated, the strength of the prediction is left as weak, and the primary TSB prediction is updated to Y (the value of the TSB where the desired entry was found) and the secondary TSB prediction is updated to X (the original primary TSB prediction). Similar examples are depicted in the remaining rows of Table 3.

TABLE 3

2<sup>nd</sup> Prediction Update Example

| | Initial State | | Result | | Next State | |
| --- | --- | --- | --- | --- | --- | --- |
| Strength | Primary TSB Prediction | Secondary TSB Prediction | TSB Number Hit | Strength | Primary TSB Prediction | Secondary TSB Prediction |
| weak | X | Y | X (hit) | ->strong | X | Y |
| weak | X | Y | Y (miss) | weak | ->Y | ->X |
| weak | X | Y | Z (hit) | weak | ->Z | ->X |
| strong | X | Y | X (hit) | strong | X | Y |
| strong | X | Y | Y (miss) | ->weak | X | Y |
| strong | X | Y | Z (miss) | ->weak | X | Y |

Although the operations included in the flow diagram of FIG. 7 are depicted as being performed in a sequential fashion, in other embodiments, one or more the operations may be performed in parallel.

In some cases, confidence in which TSB should be searched first for a virtual address is low. A misprediction regarding which TSB should be searched first may result in additional latency in the memory access, as multiple TSBs may need to be sequentially searched in order to find the desired virtual address. An embodiment of a method for activating a burst request is illustrated in the flow diagram of FIG. 8. The method begins in block 801.

The confidence of a prediction index may then be checked (block 802). Prediction confidence value 503 may be compared to a predetermined threshold for a given virtual address, and the method may then depend on the outcome of the comparison (block 803). If prediction confidence value 503 is greater than or equal to the predetermined threshold value, then the TSBs are searched sequentially starting with the predicted TSB (block 806). The sequential search may, in various embodiments, conclude when a hit is detected, or when all of the TSBs have been searched. With the completion of the sequential search, the method may then conclude in block 805.

Alternatively, if prediction confidence value 503 is less than the predetermined threshold value, then multiple TSBs are identified for searching for the virtual address, in parallel (block 804). Once the multiple searches have been initiated, the method may conclude in block 805.

Figure 8:
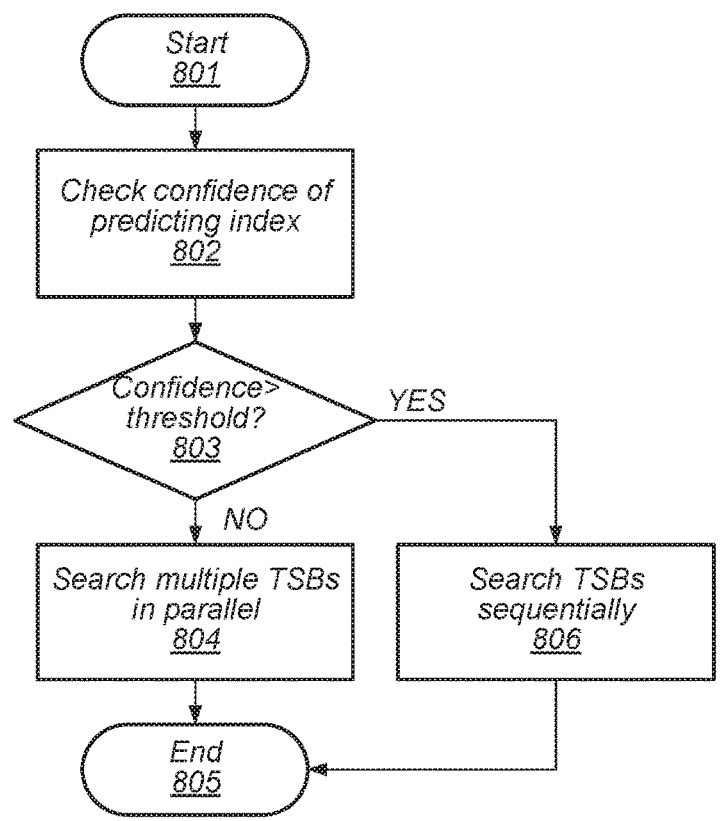
FIG. 8 illustrates a flow diagram depicting an embodiment of a method for performing burst mode prediction.

It is noted that the method depicted in the flow diagram of FIG. 8 is merely an example. In other embodiments, different operations and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of memories, wherein each memory includes a plurality of entries, wherein each entry of the plurality of entries includes a respective prediction of a plurality of predictions, wherein each prediction of the plurality of predictions includes information identifying a given one of a plurality of buffers;
   a first circuit configured to:
   receive a plurality of addresses;
   generate a plurality of hash values, wherein each hash value is based on a respective address of the plurality of addresses, and identification information associated with a respective process of a plurality of processes; and
   retrieve a respective prediction of a plurality of retrieved predictions from each one of the plurality of memories based on a respective one of the plurality of hash values; and
   a second circuit including a plurality of counters, wherein the second circuit is configured to:
   select a given prediction of the plurality of retrieved predictions based on a history of previous predictions and a respective value of each of the plurality of counters; and
   update a value of at least one counter of the plurality of counters using results of a search of a buffer identified by the given prediction.

2. The apparatus of claim 1, wherein to generate the plurality of hash values, the first circuit is further configured to generate a second hash value of the plurality of hash values using a first hash value of the plurality of hash values.

3. The apparatus of claim 1, wherein the second circuit is further configured to initiate a search, in parallel, of a subset of the plurality of buffers, in response to a determination that a confidence value included in the given prediction is less than a threshold value.

4. The apparatus of claim 1, wherein the second circuit is further configured to initiate a sequential search of a subset of the plurality of buffers, in response to a determination that a confidence level included in the given prediction is greater than or equal to a threshold value.

5. A method, comprising:
   receiving a plurality of addresses;
   generating a plurality of hash values, wherein each value is dependent upon a respective address of the plurality of addresses, and identification information associated with a respective process of a plurality of processes;
   retrieving a respective prediction of a plurality of retrieved predictions from a respective memory of a plurality of memories, wherein each memory of the plurality of memories includes a plurality of entries;
   selecting a given prediction of the plurality of retrieved predictions based on a history of previous predictions and a respective value of each counter of a plurality of counters;
   searching a subset of a plurality of buffers based on the given prediction, wherein each buffer of the plurality of buffers includes a respective portion of a map of virtual addresses to physical addresses; and
   updating a value of at least one counter of the plurality of counters based on results of searching the subset of the plurality of buffers.

6. The method of claim 5, wherein generating the plurality of hash values comprises generating a second hash value of the plurality of hash values using a first hash value of the plurality of hash values.

7. The method of claim 5, further comprising updating information in an entry included in a given one of the plurality of memories corresponding to the given prediction based on the results of searching the subset of the plurality of buffers.

8. The method of claim 5, wherein searching the subset of the plurality of buffers includes searching, in parallel, the subset of the plurality of buffers, in response to determining that a confidence value included in the given prediction is less than a threshold value.

9. The method of claim 5, wherein searching the subset of the plurality of buffers includes sequentially searching the subset of the plurality of buffers, in response to determining that a confidence value included in the given prediction is greater than or equal to a threshold value.

10. A system, comprising:
    a memory including a plurality of buffers, wherein each buffer of the plurality of buffers is configured to store a respective portion of a translation map, wherein the translation map includes a plurality of entries, and wherein each entry of the plurality of entries maps a given virtual address to a corresponding physical address;
    a processor including a plurality of counters, wherein the processor is configured to:

receive a plurality of addresses;
generate a plurality of hash values, wherein each hash value is dependent upon a respective address of the plurality of addresses, and identification information associated with a respective process of a plurality of processes;
retrieve a respective prediction of a plurality of retrieved predictions from each memory of a plurality of memories dependent upon a respective one of the plurality of hash values;
select a given prediction of the plurality of retrieved predictions dependent upon a history of previous predictions and respective value of each counter of the plurality of counters;
and update a value of at least one counter of the plurality of counters based on results of a search of one or more of the plurality of buffers using the given prediction.

11. The system of claim 10, wherein to generate the plurality of hash values, the processor is further configured to generate a second hash value of the plurality of hash values using a first hash value of the plurality of hash values.

12. The system of claim 10, wherein the processor is further configured to update information in an entry included in a given one of the plurality of memories corresponding to the given prediction based on the results of the search.

13. The system of claim 10, wherein the processor is further configured to initiate a search, in parallel, of a subset of the plurality of buffers, in response to a determination that a confidence value included in the given prediction is less than a threshold value.

14. The system of claim 10, wherein the processor is further configured to initiate a sequential search of a subset of the plurality of buffers, in response to a determination that a confidence value included in the given prediction is greater than or equal to a threshold value.

* * * * *

UNITED STATES PATENT AND TRADEMARK OFFICE
CERTIFICATE OF CORRECTION

PATENT NO. : 10,255,197 B2
APPLICATION NO. : 15/215027
DATED : April 9, 2019
INVENTOR(S) : Pape et al.

Page 1 of 1

It is certified that error appears in the above-identified patent and that said Letters Patent is hereby corrected as shown below:

On the Title Page

Column 2, under Abstract, Line 10, delete "has" and insert -- hash --, therefor.

Signed and Sealed this
Third Day of November, 2020

Andrei Iancu
*Director of the United States Patent and Trademark Office*